(12) United States Patent
Marley et al.

(10) Patent No.: US 8,089,295 B2
(45) Date of Patent: Jan. 3, 2012

(54) WAFER LEVEL BALANCED CAPACITANCE DESIGN FOR MAGNETIC HEADS

(75) Inventors: Arley Cleveland Marley, San Jose, CA (US); David John Seagle, Morgan Hill, CA (US)

(73) Assignee: Hitachi Global Storage Technologies Netherlands B.V., Amsterdam (NL)

( * ) Notice: Subject to any disclaimer, the term of this patent is extended or adjusted under 35 U.S.C. 154(b) by 1039 days.

(21) Appl. No.: 11/967,478

(22) Filed: Dec. 31, 2007

(65) Prior Publication Data

US 2009/0168259 A1    Jul. 2, 2009

(51) Int. Cl.
*G01R 31/02* (2006.01)
*G11B 5/127* (2006.01)

(52) U.S. Cl. .................. 324/762.01; 360/110; 360/319

(58) Field of Classification Search .................. None
See application file for complete search history.

(56) References Cited

U.S. PATENT DOCUMENTS

| | | | |
|---|---|---|---|
| 5,557,492 A | 9/1996 | Gill et al. | |
| 6,026,559 A * | 2/2000 | Ishiwata | 29/603.14 |
| 6,324,036 B1 | 11/2001 | Dill, Jr. et al. | |
| 6,512,661 B1 | 1/2003 | Louis | |
| 7,037,847 B2 * | 5/2006 | Le et al. | 438/712 |
| 2006/0198057 A1 | 9/2006 | Leung et al. | |
| 2007/0002502 A1 | 1/2007 | Burbank et al. | |

* cited by examiner

*Primary Examiner* — Vinh Nguyen
(74) *Attorney, Agent, or Firm* — Patterson & Sheridan, LLP

(57) ABSTRACT

Embodiments of the invention provide methods, systems and apparatus for testing electronic components, and more specifically for testing magnetoresistive heads. A pair of top shield pads and a pair of bottom shield pads may be formed in a kerf region of a wafer on which magnetoresistive heads are formed. The top shield pads, bottom shield pads, and a magnetoresistive head may form a circuit that may be coupled with a testing circuit to exchange test signals configured to test the magnetic head. The pair of bottom shield pads may provide balanced impedance to substrate that nullifies the effects of broadband noise.

22 Claims, 11 Drawing Sheets

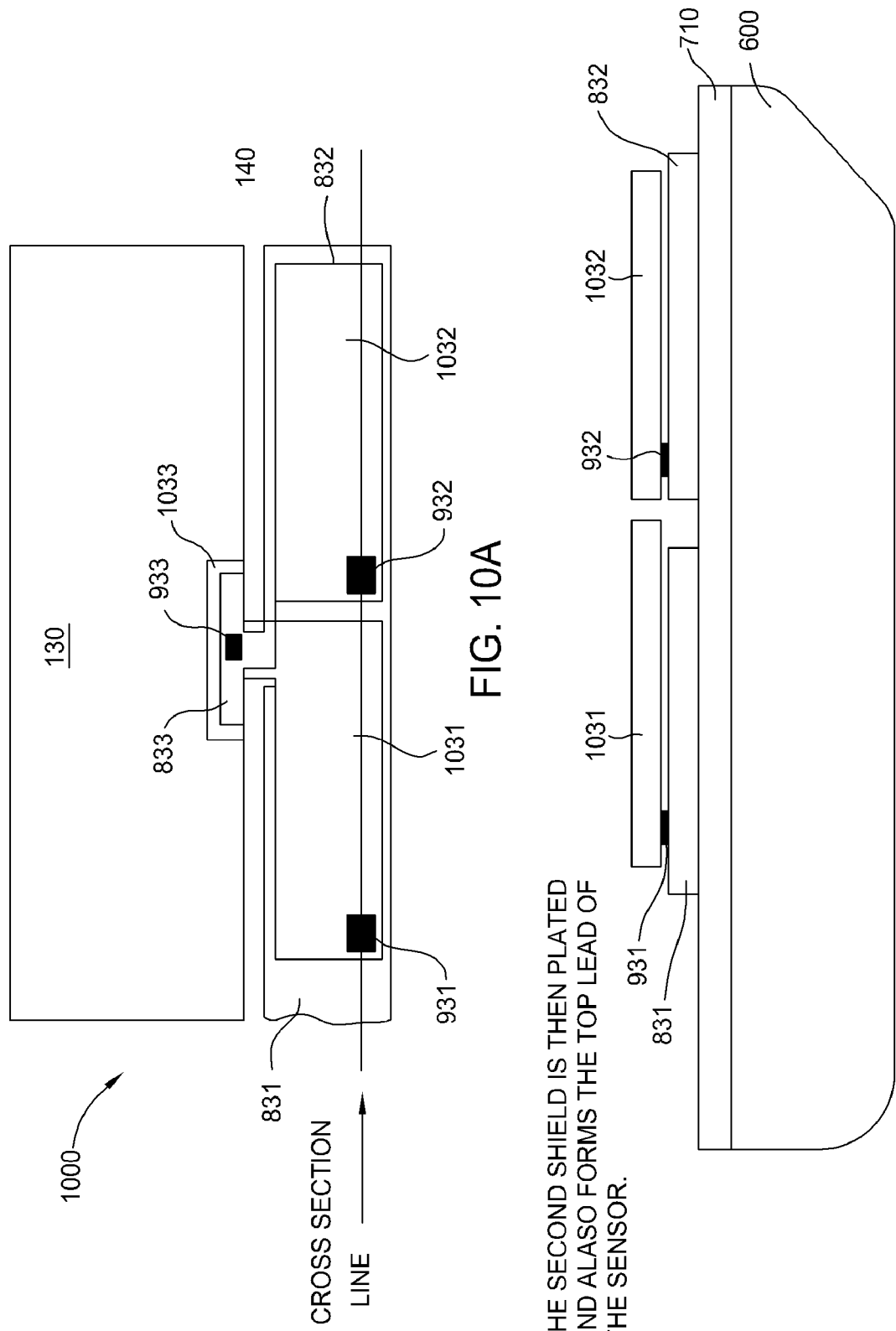

WAFER LEVEL BALANCED CAPACITANCE DESIGN FOR MAGNETIC HEADS

BACKGROUND OF THE INVENTION

1. Field of the Invention

Embodiments of the present invention generally relate to testing electronic components, and more specifically to testing magnetoresistive heads.

2. Description of the Related Art

Magnetic disk drive based systems have been widely accepted in the computer industry as a cost-effective form of data storage. In a magnetic disk drive system, a magnetic recording medium in the form of a disk rotates at high speed while a magnetic head "flies" slightly above the surface of the rotating disk. The magnetic disk is rotated by means of a spindle drive motor. The magnetic head is attached to or formed integrally with a "slider" which is suspended over the disk by a suspension assembly, which in turn is attached to an actuator arm. As the magnetic disk rotates at an operating speed, the moving air generated by the rotating disk in conjunction with the physical design of the slider lifts the magnetic head, allowing it to glide or "fly" slightly above and over the disk surface on a cushion of air, referred to as an air bearing.

Magnetoresistive (MR) sensors are particularly useful as read elements in magnetic heads, used in the data storage industry for high data recording densities. Examples of MR materials used in the storage industry include anisotropic magnetoresistive (AMR), giant magnetoresistive (GMR), and tunneling magnetoresistive (TMR). MR sensors are deposited as small and thin multi-layered sheet resistors on a structural substrate. The sheet resistors can be coupled to external devices by contact to metal pads which are electrically connected to the sheet resistors.

To achieve the high areal densities required by the data storage industry, the sensors are made with commensurately smaller dimensions. The smaller the dimensions, the more sensitive the thin sheet resistors become to damage from spurious current or voltage spikes during fabrication. Furthermore, the likelihood that fabrication defects will adversely affect the performance of the magnetic heads is greater with relatively smaller dimensions. While fabricating a plurality of substantially similar magnetic heads simultaneously on the same wafer, fabrication defects may occur in one or more of the plurality of magnetic heads. Another significant cause of defects may be intrinsic variations in the orientation of crystals used to form the magnetic head and/or regions around it. Accordingly, it is not uncommon to test the magnetic heads after fabrication to identify defective magnetic heads.

SUMMARY OF THE INVENTION

Embodiments of the present invention are generally related to testing electronic components, and more specifically to testing magnetoresistive heads.

One embodiment of the invention provides a wafer generally comprising a plurality of magnetic heads formed thereon, wherein the plurality of magnetic heads are separated by a kerf region. The wafer further comprises a first top shield pad and a second top shield pad formed in the kerf region, wherein the first top shield pad is electrically coupled with a first surface of a magnetic head. A first bottom shield pad and a second bottom shield pad are also formed in the kerf region, wherein the first bottom shield pad is electrically coupled with a second surface of the magnetic head, and wherein the first top shield pad is electrically coupled with the second bottom shield pad and the first bottom shield pad is electrically coupled with the second top shield pad.

Another embodiment of the invention provides a method for fabricating magnetic heads. The method generally comprises forming a plurality of magnetic heads on a wafer, wherein the plurality of magnetic heads are separated by a kerf region and forming a first top shield pad and a second top shield pad in the kerf region, wherein the first top shield pad is electrically coupled with a first surface of a magnetic head. The method further comprises forming a first of bottom shield pad and a second bottom shield pad in the kerf region, wherein the first bottom shield pad is electrically coupled with a second surface of the magnetic head, and wherein the first top shield pad is electrically coupled with the second bottom shield pad and the first bottom shield pad is electrically coupled with the second top shield pad.

Yet another embodiment of the invention provides a method of testing a magnetic head. The method generally comprises coupling a first probe of a testing device with a first top shield pad formed in a kerf region of a wafer comprising a plurality of magnetic heads formed thereon, wherein the first top shield pad is electrically coupled with a first surface of a magnetic head and a first bottom shield pad and coupling a second probe of the testing device with a second top shield pad formed in the kerf region, wherein the second top shield pad is coupled with a second bottom shield pad, the second bottom shield pad being coupled with a second surface of the magnetic head. The method further comprises transferring a test signal to the magnetic head via the first top shield pad and receiving the test signal from the magnetic head via the second top shield pad.

A further embodiment of the invention provides a system generally comprising a wafer and a testing device. The wafer generally comprises a plurality of magnetic heads formed thereon, wherein the plurality of magnetic heads are separated by a kerf region and a first top shield pad and a second top shield pad formed in the kerf region, wherein the first top shield pad is electrically coupled with a first surface of a magnetic head. The wafer further comprises a first of bottom shield pad and a second bottom shield pad formed in the kerf region, wherein the first bottom shield pad is electrically coupled with a second surface of the magnetic head, and wherein the first top shield pad is electrically coupled with the second bottom shield pad and the first bottom shield pad is electrically coupled with the second top shield pad.

The testing device generally comprises a first probe coupled with the first top shield pad and a second probe coupled with the second top shield pad, wherein the first probe is configured to transfer a test signal for testing the magnetic head to the first top shield pad and the second probe is configured to provide a return path for the test signal.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

FIGS. 10A and 10B illustrate exemplary top shield pads according to an embodiment of the invention.

DETAILED DESCRIPTION

Embodiments of the invention provide methods, systems and apparatus for testing electronic components, and more specifically for testing magnetoresistive heads. A pair of top shield pads and a pair of bottom shield pads may be formed in a kerf region of a wafer on which magnetoresistive heads are formed. The top shield pads, bottom shield pads, and a magnetoresistive head may form a circuit that may be coupled with a testing circuit to exchange test signals configured to test the magnetic head. The pair of bottom shield pads may provide balanced impedance to substrate that nullifies the effects of broadband noise.

In the following, reference is made to embodiments of the invention. However, it should be understood that the invention is not limited to specific described embodiments. Instead, any combination of the following features and elements, whether related to different embodiments or not, is contemplated to implement and practice the invention. Furthermore, in various embodiments the invention provides numerous advantages over the prior art. However, although embodiments of the invention may achieve advantages over other possible solutions and/or over the prior art, whether or not a particular advantage is achieved by a given embodiment is not limiting of the invention. Thus, the following aspects, features, embodiments and advantages are merely illustrative and, unless explicitly present, are not considered elements or limitations of the appended claims.

In the following, reference is made to embodiments of the invention. However, it should be understood that the invention is not limited to specific described embodiments. Instead, any combination of the following features and elements, whether related to different embodiments or not, is contemplated to implement and practice the invention. Furthermore, in various embodiments the invention provides numerous advantages over the prior art. However, although embodiments of the invention may achieve advantages over other possible solutions and/or over the prior art, whether or not a particular advantage is achieved by a given embodiment is not limiting of the invention. Thus, the following aspects, features, embodiments and advantages are merely illustrative and, unless explicitly present, are not considered elements or limitations of the appended claims.

Figure 1:
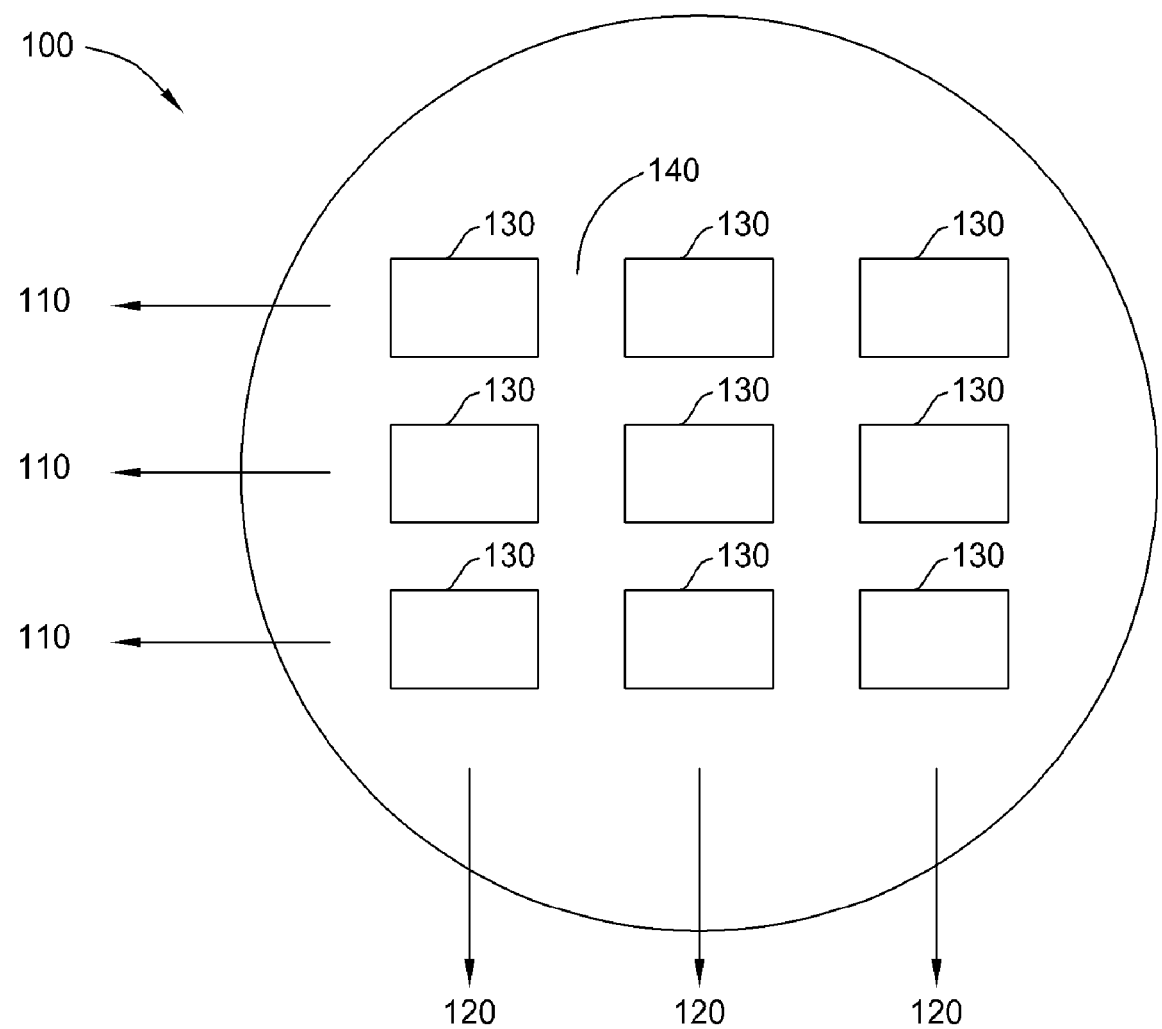
FIG. 1 illustrates an exemplary wafer according to an embodiment of the invention.

During fabrication, a plurality of magnetic heads may be simultaneously formed on a disk called a wafer. FIG. 1 illustrates an exemplary wafer 100 comprising a plurality of rows 110 and a plurality of columns 120 comprising magnetic heads 130. A kerf region 140 may separate each of the magnetic heads 130, as illustrated in FIG. 1. The wafer 100 may comprise a substrate upon which the magnetic heads 130 are formed. In one embodiment of the invention, the substrate may comprise any combination of Alumina and Titanium Carbide. Forming the magnetic heads 130 on the substrate may involve any reasonable masking technique and any reasonable deposition technique such as, for example, plating, sputtering, and the like. While nine magnetic heads 130 are illustrated in FIG. 1, in alternative embodiments, any number of magnetic heads 130 may simultaneously be formed on the wafer 100.

Figure 2A:
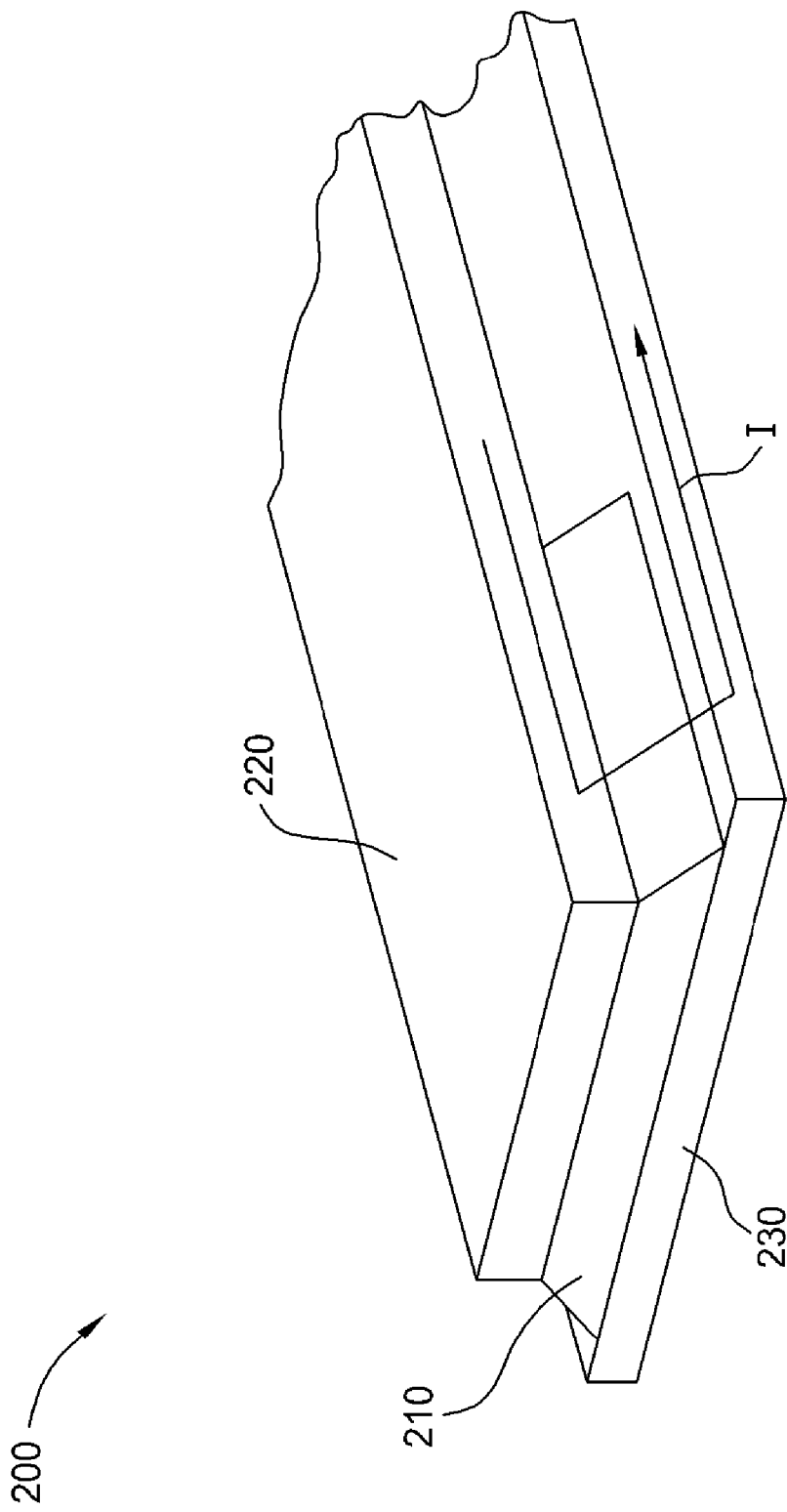
FIG. 2A illustrates an exemplary magnetic head according to an embodiment of the invention.
Figure 2B:
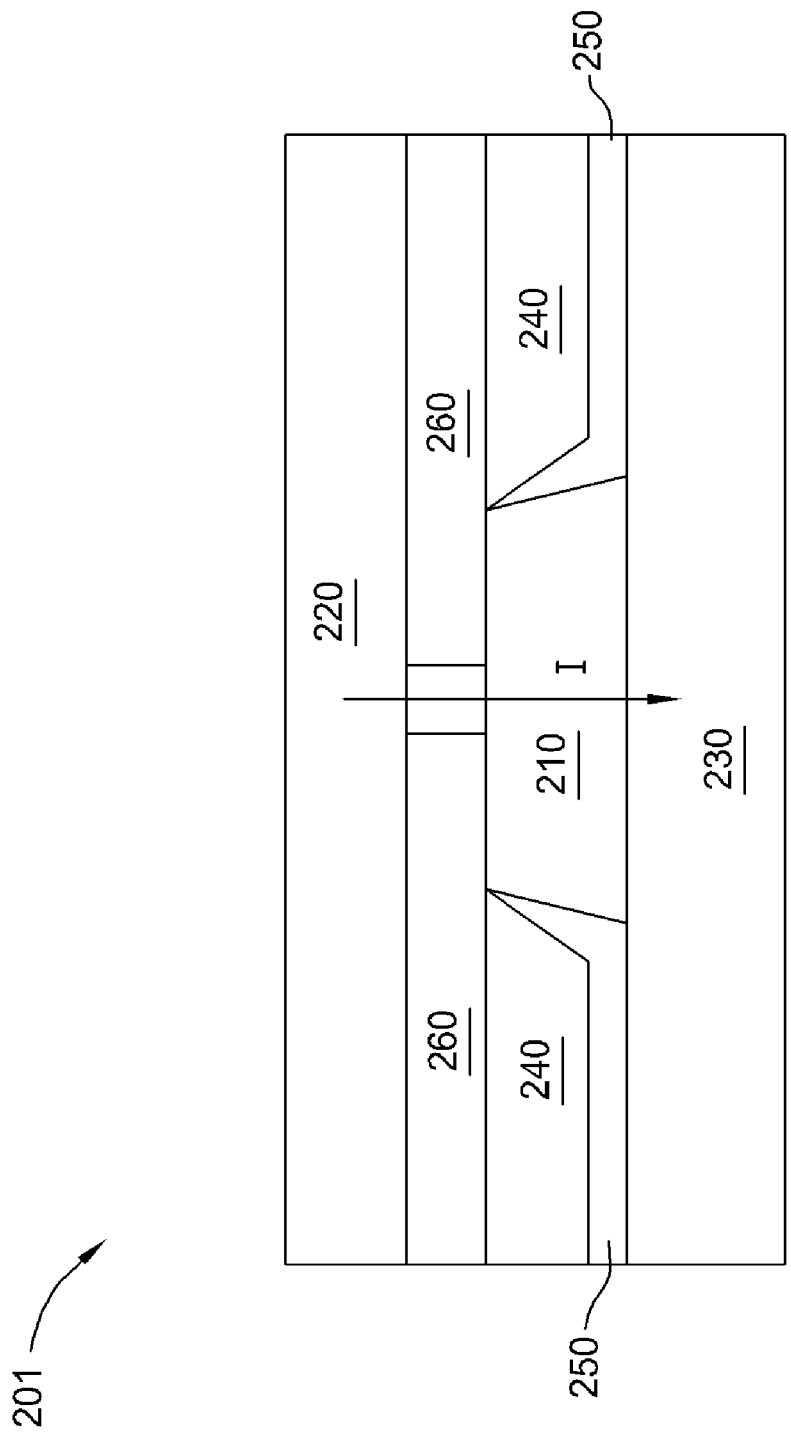
FIG. 2B illustrates an Air Bearing Surface (ABS) view of an exemplary magnetic head, according to an embodiment of the invention.

In one embodiment of the invention, the magnetic heads 130 may be Current Perpendicular to Plane (CPP) head structures. CPP head structures may use the tunneling magnetoresistive (TMR) effect during operation. CPP structures are advantageous because they may allow the design of magnetic heads with superior signal to noise performance. FIGS. 2A and 2B illustrate an exemplary CPP magnetic head structure 200 according to an embodiment of the invention. As illustrated in FIG. 2A, the CPP magnetic head structure may generally include a TMR element 210 coupled with a top shield layer 220 and a bottom shield layer 230. The TMR element may be formed with one or more layers including for example, a seed layer anti-ferromagnetic layer, pinned layer, barrier layer, free layer, nonmagnetic cap layer, and the like (not shown in Figures). Each of the top shield 220 and bottom shield 230 may be formed with a suitable metal, such as, for example, a Nickel-Iron (NiFe) alloy. In one embodiment of the invention, the shield layers may be formed with an 80/20 NiFe alloy, commonly known as permalloy.

FIG. 2B illustrates an air bearing surface (ABS) view of an exemplary CPP magnetic head structure 201, according to an embodiment of the invention. As illustrated in FIG. 2B, the top shield 220 and bottom shield 230 are coupled with the TMR element 210. An insulator layer 250 may be formed on a surface of the bottom shield layer 230 that is not covered by the TMR element 210. A portion of the insulator layer 250 may extend along a sidewall portion of the TMR element 210 as illustrated in FIG. 2B. Further, as illustrated in FIG. 2B, a hard magnetic layer 240 may be disposed on the insulator layer 250. In some embodiments, a second insulator layer 260 may be formed between the hard magnetic layer 240 and the top shield 220. The top shield 220 may couple with the TMR element 210 through a recess formed in the insulator layer 260. While an insulator layer 260 is illustrated in FIG. 2A and described herein, in some embodiments, the insulator layer 260 may be omitted. In embodiments omitting the insulator layer 260, the shield layer 220 may be formed on the hard magnetic layer 240 and the TMR element 210.

During operation of the CPP magnetic head structures 200 and 201 described above, a sense current I may be passed vertically through the top shield 220, TMR element 210, and bottom shield 230, as illustrated in FIGS. 2A and 2B. When a magnetic storage medium such as a magnetic disk is rotated in close proximity to the CPP magnetic head structure, magnetic fields on the storage medium cause the resistance of the TMR element 210 to change. The magnitude of the sense current I also changes in relation to the resistance of the TMR element 210, thereby allowing the CPP magnetic head structure to read the storage medium. Alternatively, the sense current I may be maintained at a constant level and fluctuations in voltage in response to the changing resistance of the TMR element may be used to read the storage medium.

As discussed above, shrinking sizes of magnetic heads has resulted in an increased probability of forming one or more defective magnetic heads on a wafer 100 (see FIG. 1). Smaller geometries may require increased precision while forming masking and deposition layers during fabrication of the magnetic heads 130. For example, fabrication defects may result in variations in thicknesses or relative positions of the shield layers, hard magnetic layers, insulator layers, and/or TMR elements in the plurality of magnetic heads 130 formed on the wafer 100 (see FIG. 1). Because fabrication defects may not occur uniformly in all devices formed on a wafer, it has become increasingly difficult to form substantially similar devices simultaneously on the same wafer. For example, fabrication defects may cause some, but not all, of the plurality of magnetic heads 130 of a wafer 100 to be defective.

In one embodiment of the invention, the magnetic heads 130 may be tested while they are still on the wafer 100, i.e., before, individual magnetic heads are diced. Testing the magnetic heads while they are still on the wafer may avoid the cost of further processing/fabrication of defective magnetic heads. For example, in some embodiments, a wafer may be discarded if a threshold number of magnetic heads on the wafer are found to be defective. By discarding such defective wafers, the cost of further processing the wafers such as, for example, dicing, lapping, installation into a head gimble assembly (HGA), and the like, may be avoided. In alternative embodiments, only the defective magnetic heads on a wafer may be discarded.

Referring back to FIG. 1, kerf regions 140 are provided to separate the magnetic heads 130 from one another. One or more test pads may be formed in the kerf region of wafer 100 to facilitate testing of the magnetic heads 130. After testing the magnetic heads 130, the wafer may be mechanically diced along the kerf region 140 to separate each individual magnetic head. For example, in one embodiment, the magnetic heads may be diced into rows. One or more surfaces of the magnetic heads may subsequently be lapped before further dicing the rows into individual magnetic heads.

In one embodiment, the test pads in the kerf region may be configured to supply a current I that passes through the magnetic head 130 as illustrated in FIGS. 2A and 2B. The properties of a test current passing through the TMR element of the magnetic head 130 may be analyzed by a spectrum analyzer configured to determine whether one or more electrical and/or magnetic properties of each magnetic head 130 is within predetermined specifications. Therefore, the spectrum analyzer may determine whether a magnetic head is defective based on the analysis of the current.

Figure 3:
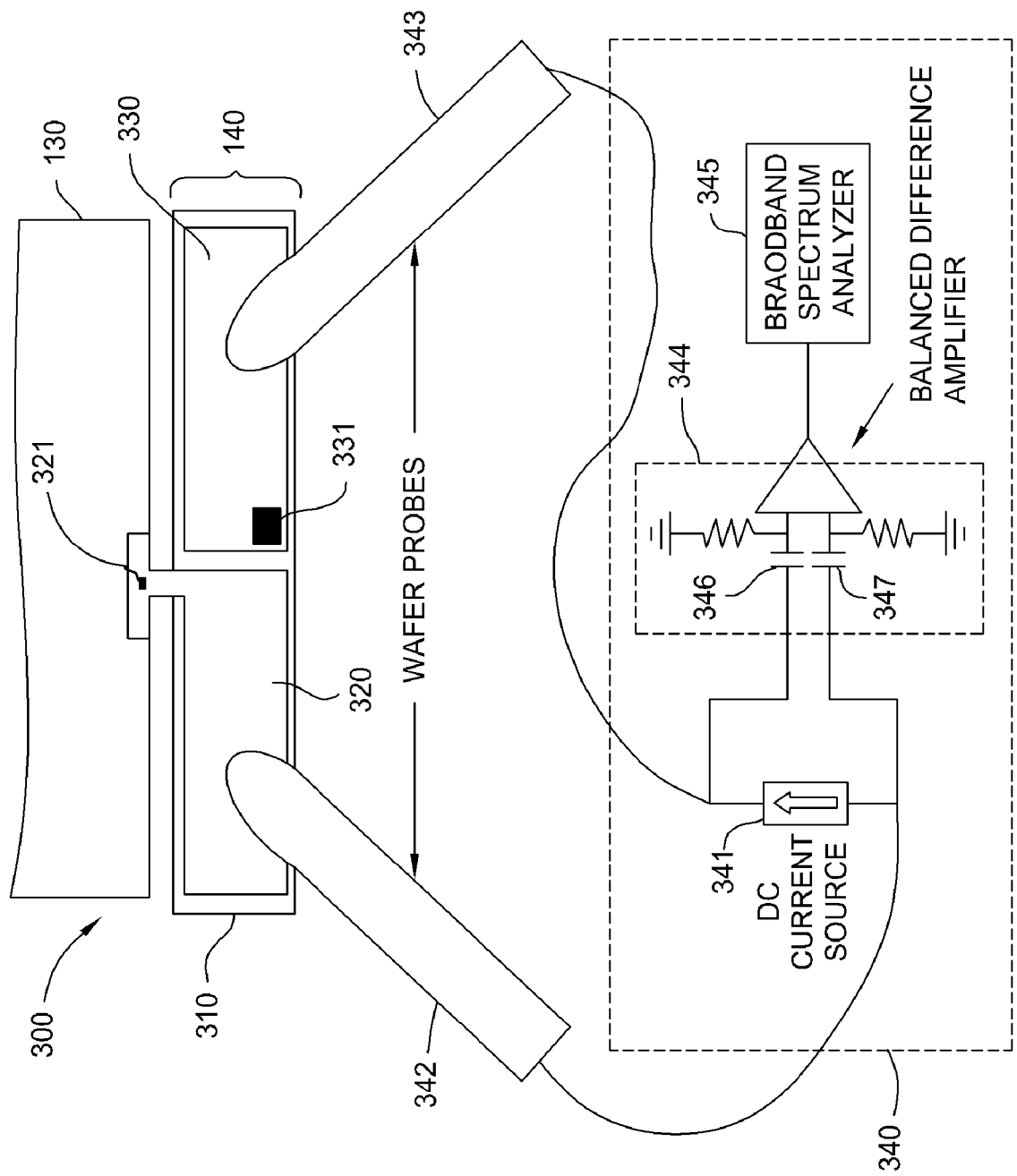
FIG. 3 illustrates an exemplary testing system according to an embodiment of the invention.

FIG. 3 illustrates testing of a magnetic head 130 according to an embodiment of the invention. As illustrated in FIG. 3, a plurality of pads may be formed in a kerf region 140 of a wafer. For example a bottom shield pad 310 and two top shield pads 320 and 330 are illustrated. In one embodiment, an insulator layer (not shown) may be formed between the top shield pads 320/330 and the bottom shield pad 310. An insulator layer (not shown) may also exist between the bottom shield pad 310 and the substrate on which the magnetic heads are formed. The bottom shield pad 310 may be coupled with a bottom shield 230 (FIG. 2A) of a magnetic head 130 (not shown in FIG. 3). The top shield pad 320 may be coupled with a top shield 220 (FIG. 2A) of a magnetic head 130. For example, top shield pad 320 may be coupled with a top shield 220 of a magnetic head 130 at a location 321, as illustrated in FIG. 3.

In one embodiment, the top shield pad 330 may be electrically coupled with the bottom shield pad 310 at a location 331. For example, a metal via may be formed through the insulator layer (not shown) separating the top shield pad 330 and the bottom shield pad 310 to connect the bottom shield pad 310 and top shield pad 330. Therefore, the top shield pad 320 is electrically coupled with a top shield 220 of a magnetic head 130, and the top shield pad 330 is electrically coupled (by means of the interconnect 331 and bottom shield pad 310) with a bottom surface of the magnetic head 130.

The top shield pads 320 and 330 may be configured to facilitate exchange of test signals, for example, a test current I, between the magnetic head 130 and a testing circuit 340. An exemplary testing circuit 340 according to an embodiment of the invention is illustrated in FIG. 3. Testing circuit 340 may include a Direct Current (DC) source 341 coupled with a pair of wafer probes 342 and 343, an amplifier circuit 344 and a spectrum analyzer 345.

As illustrated in FIG. 3, wafer probe 342 may transfer current from the DC current source 341 to the top shield pad 320. The current may travel from the top shield pad to the magnetic head 130 through the interconnect 321. The current may then travel through the magnetic head 130 to the bottom shield pad 310 and return to the test circuit 340 via interconnect 331, top shield pad 330 and wafer probe 343. In some embodiments, the direction of current in the DC current source 341 may be reversed. Therefore, the current may travel to the TMR element via wafer probe 343 and return via wafer probe 342.

Amplifier circuit 344 may amplify an electrical property measured across the wafer probes 342 and 343, as illustrated in FIG. 3. In one embodiment, the measured electrical property may be a voltage across the wafer probes 342 and 343. Accordingly, as shown in FIG. 3, inputs of the amplifier circuit 344 may be connected to the wafer probes 342 and 344 and configured to receive an input signal representing the electrical property. In some embodiments, the electrical property measured across the wafer probes may have a relatively small amplitude signal. Therefore, the amplifier circuit 344 may be configured to generate a larger amplitude output signal having the same, or nearly the same, waveform as the measured input signal, thereby facilitating analysis of the measured electrical property.

The output signal generated by the amplifier circuit 344 may be received by the spectrum analyzer 345. Spectrum analyzer 345 may analyze the broadband noise in the output. In one embodiment of the invention, at least a portion of the broadband magnetic noise may be attributable to the magnetic head structure. Therefore, by analyzing the broadband noise in the output signal, spectrum analyzer 345 may indicate whether a magnetic head is defective.

In one embodiment of the invention, the spectrum analyzer 345 may be a Direct Current (DC) device and the current source 341 may be an Alternating Current (AC) device. Accordingly, one or more capacitors, for example, capacitors 346 and 347 may be provided in the amplifier circuit 344 to separate a DC portion of the testing device 340 from an AC portion of the testing device. While the current source 341, amplifier circuit 344, and spectrum analyzer 345 are shown integrated into a single testing circuit 340 in FIG. 3, each of the current source 341, amplifier circuit 344, and spectrum analyzer 345 may be separate and independent devices in other embodiments. In alternative embodiments, any two of the current source 341, amplifier circuit 344, and spectrum analyzer 345 may be integrated into a single device.

Figure 4:
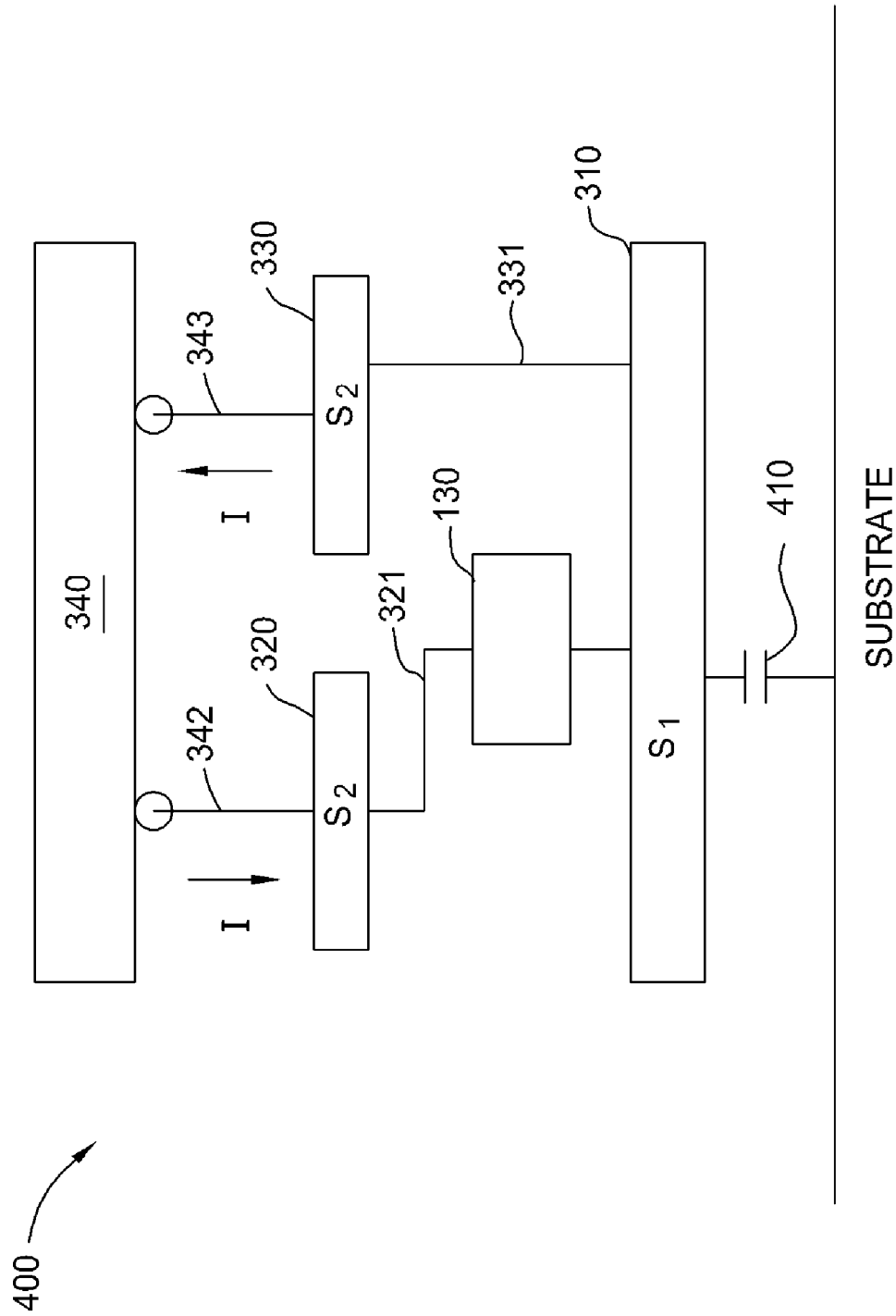
FIG. 4 illustrates an exemplary circuit diagram of a testing system according to an embodiment of the invention.

FIG. 4 illustrates a circuit 400 formed by the exemplary structure illustrated in FIG. 3 using top shield pads 320, 330, bottom shield pad 310, a magnetic head 130, and a testing device 340. As illustrated in FIG. 4, a test current I may enter from a test circuit 340 to the top shield pad 320 via probe 342, and travel to the magnetic head 130 via a connection 321 connecting the top shield pad 320 to the magnetic head 130.

The current may travel through the magnetic head 130 to bottom shield 310 and return to top shield 330 via the connection 331 connecting the bottom shield pad 310 to the top shield pad 330. The current may travel from the top shield pad 330 back to the test circuit 340. The current may be analyzed by the test circuit 340 to determine whether the magnetic head 130 is defective.

As illustrated in FIG. 4, a capacitance 410 may exist between the bottom shield pad 310 and a substrate of the wafer on which the magnetic head 130 is formed. The capacitance 410 may pick up interference such as for example, Electromagnetic Interference (EMI) and/or radio frequency interference (RFI). The interference may be picked up because capacitor 410 creates an unbalanced circuit. The interference picked up by capacitor 410 may adversely affect the output signal analyzed by the spectrum analyzer, thereby making testing of the magnetic heads unreliable.

Figure 5:
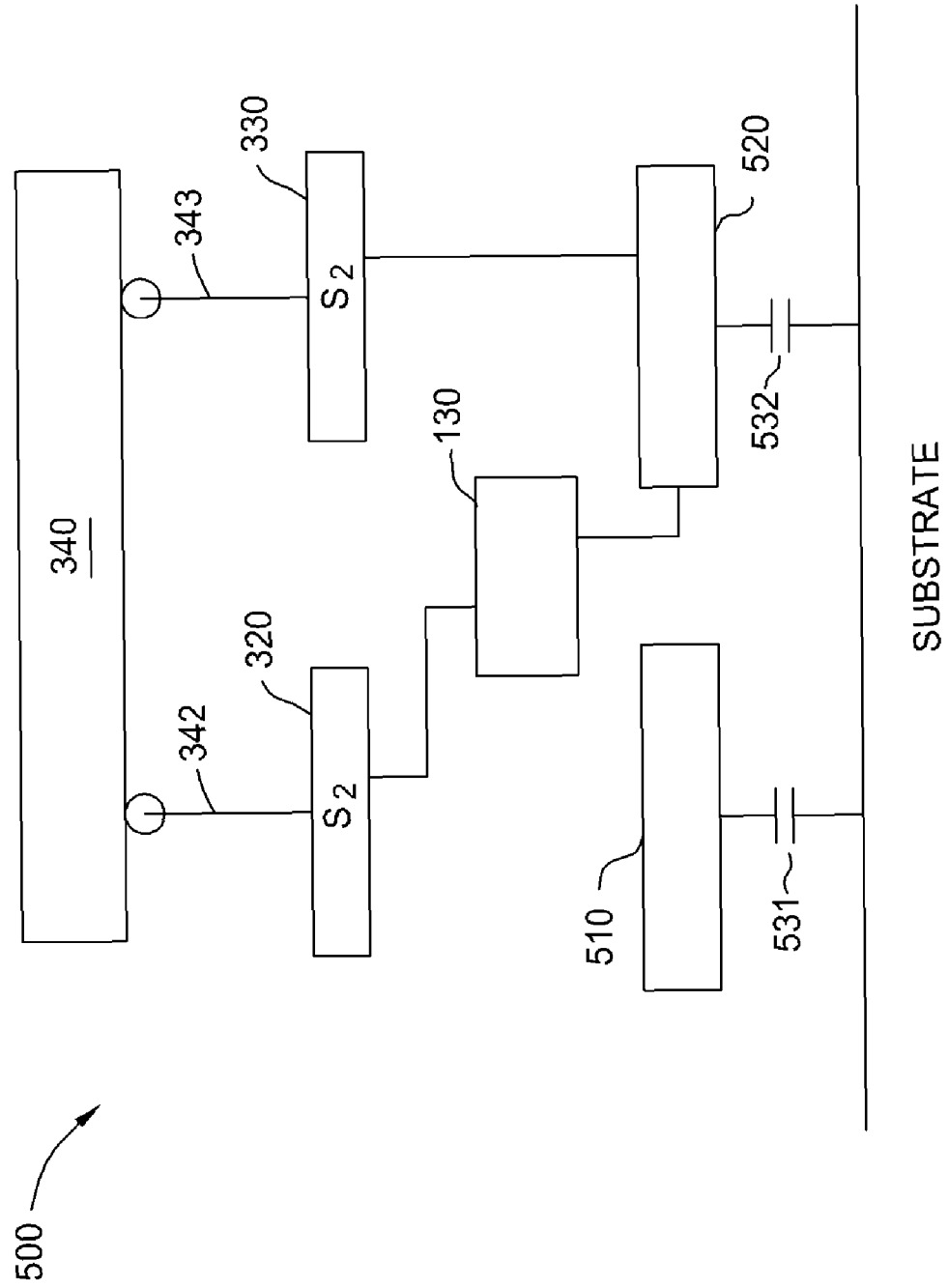
FIG. 5 illustrates another exemplary circuit diagram of a testing system according to an embodiment of the invention.

In one embodiment of the invention, to avoid the adverse effects of interference picked up by the capacitance 410, the bottom shield layer 310 may be split into two separate shield pads to provide wafer level balanced capacitance that nullifies the effects of broadband magnetic noise. FIG. 5 illustrates an exemplary circuit 500 configured to provide wafer level balanced capacitance according to an embodiment of the invention. As illustrated in FIG. 5, a test circuit 340 may be coupled with a top shield pad 320 via probe 342. Top shield pad 320 may be coupled with a first bottom shield pad 510. The top shield pad 320 may also be coupled to a magnetic head 130, as illustrated. Magnetic head 130 may be coupled with a second bottom shield pad 520. Bottom shield pad 520 may be coupled with top shield pad 330, and the top shield pad may be coupled with the test circuit 340 using a wafer probe 343.

A current I from the test circuit 340 may enter the top shield pad 320 and travel to the magnetic head 130. The current may travel through the magnetic head 130 to the bottom shield pad 520 and return to the testing device 340 via top shield pad 330. As illustrated in FIG. 5, a capacitance 531 may exist between the bottom shield pad 510 and the substrate. A further capacitance 532 may exist between the bottom shield pad 520 and the substrate. In one embodiment of the invention, the capacitances 531 and 532 may have a relatively equal magnitude configured to nullify the effects of interference. In other words, the interference picked by the capacitance 531 may cancel out the interference picked up by the capacitance 532.

Figure 6A:
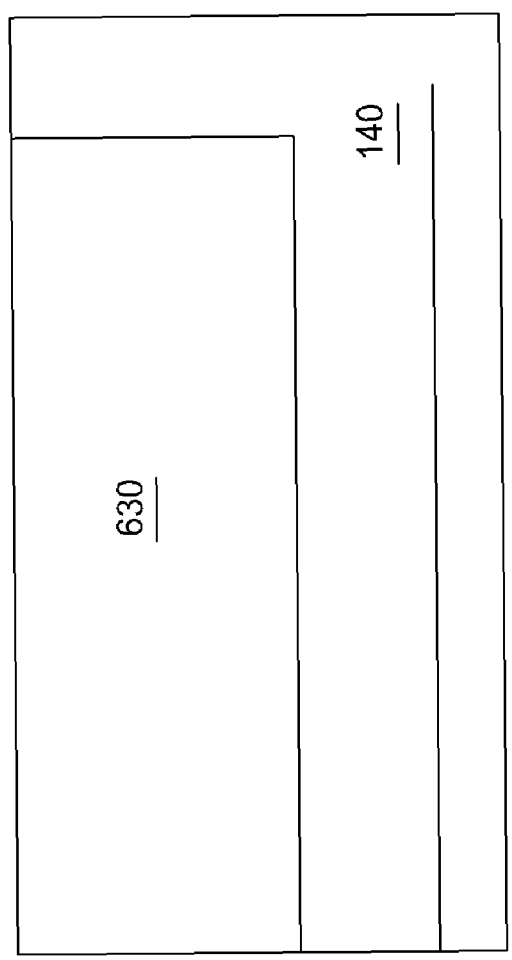
FIGS. 6A and 6B illustrate an exemplary substrate according to an embodiment of the invention.
Figure 6A:
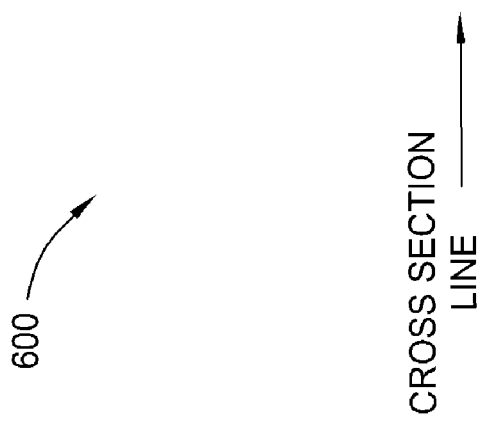
Figure 6B:

Fabricating the wafer level balanced capacitance magnetic head device may begin by obtaining a substrate such as, for example, substrate 100 illustrated in FIG. 1. The substrate may comprise any suitable material including for example any combination of Alumina and Titanium Carbide. FIG. 6A depicts a top view of a portion of a substrate 600 on which a magnetic head 130 may be formed. FIG. 6A illustrates a region 630 on which the magnetic head 130 may be formed. A kerf region 140 for separating the magnetic heads 130 and for forming the top and bottom shield pads is also shown in FIG. 6. FIG. 6B illustrates a cross sectional view of the substrate along the line in the kerf region 140 shown in FIG. 6A.

Figure 7:
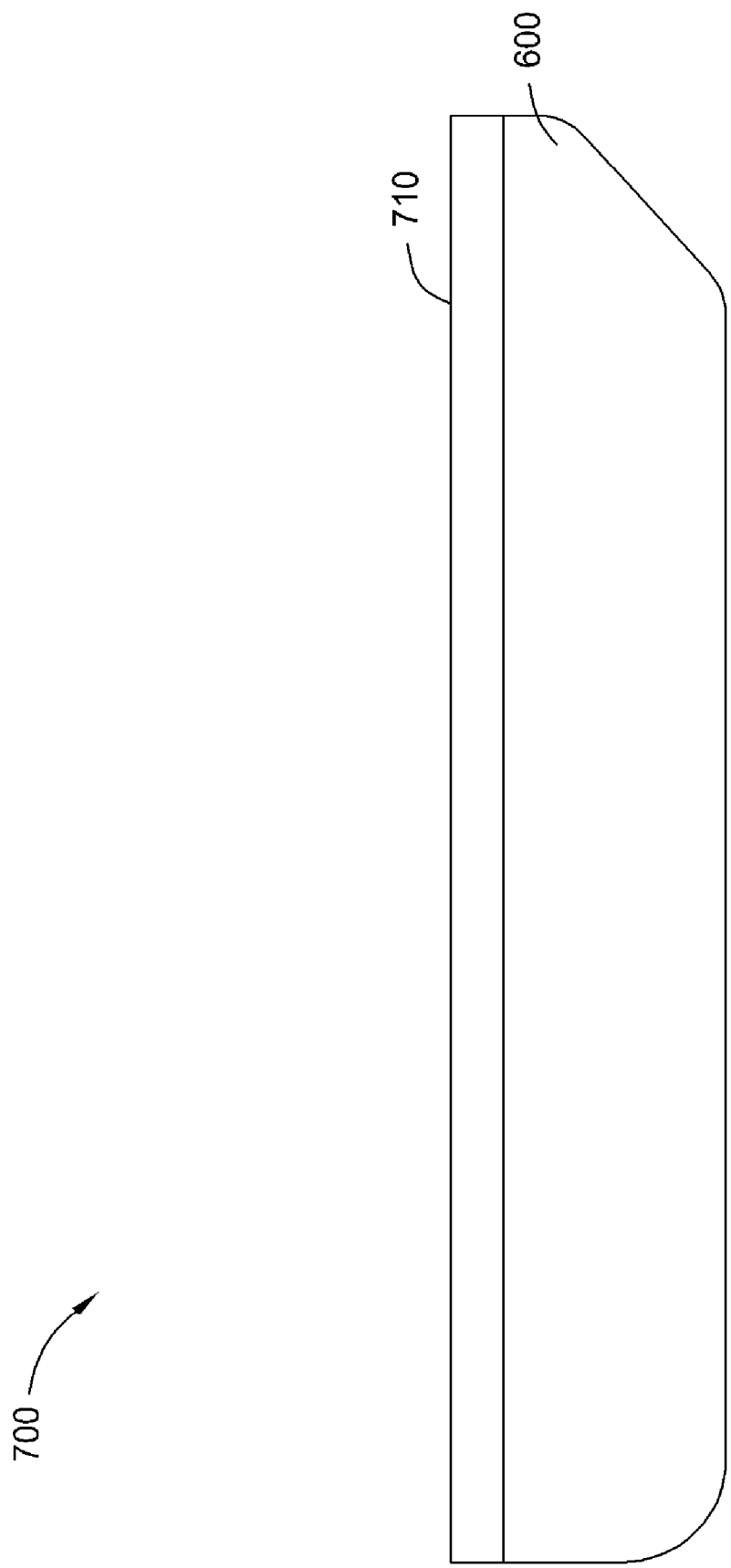
FIG. 7 illustrates an exemplary insulator layer formed on a substrate according to an embodiment of the invention.

In a first fabrication step, a first insulator layer may be deposited on the substrate. FIG. 7 illustrates an insulator layer 710 deposited on the substrate. The first insulator layer 710 may be formed with any suitable material, for example, alumina or silicon dioxide.

Figure 8A:
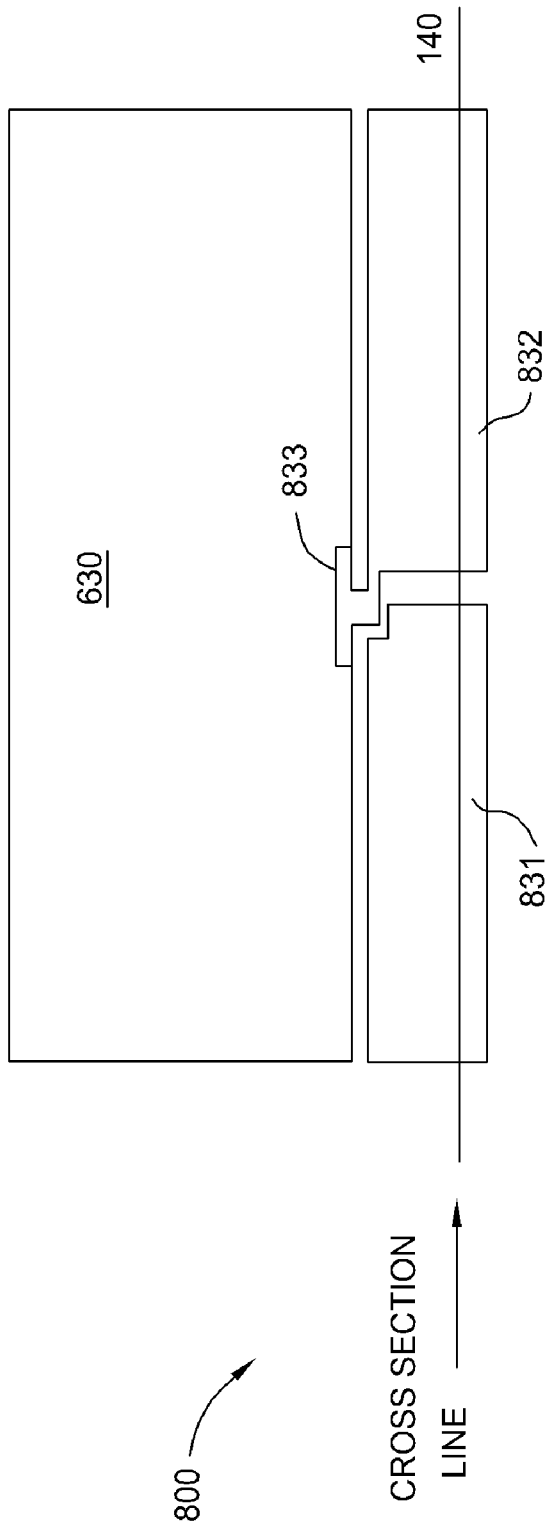
FIGS. 8A and 8B illustrate exemplary bottom shield pads according to an embodiment of the invention.
Figure 8B:
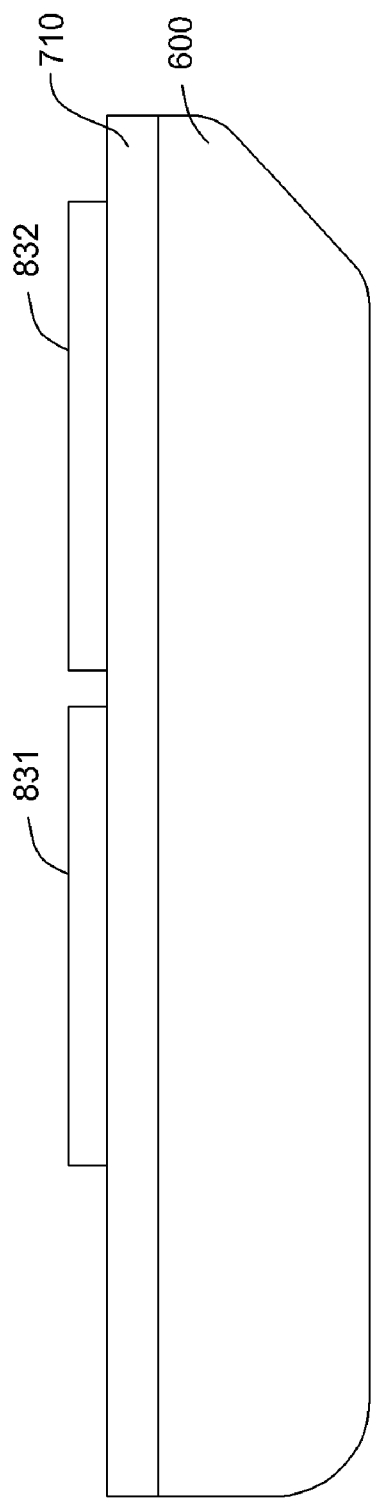

In a subsequent fabrication step two bottom shield pads may be formed in the kerf region 140, on top of the first insulator layer 710. FIG. 8A illustrates a top view of two bottom shield pads 831 and 832 formed over a kerf region 140 of the substrate. A portion 833 of the bottom shield pad 832 may extend into the region 630 in which the magnetic head 130 is to be formed. In one embodiment, the portion 833 may be configured to couple with a bottom shield 230 of the magnetic head 130 (see FIG. 2). In alternative embodiments, the portion 833 may correspond to the bottom shield 230 of the magnetic head. FIG. 8B illustrates a cross sectional view of the substrate along the line shown in FIG. 8A. As illustrated in FIG. 8A, each of the bottom shield pads 831 and 832 are formed over the first insulator layer 710.

Bottom shield pads 831 and 832 may correspond with the bottom shield pads 531 and 532 illustrated in FIG. 5. As illustrated in FIG. 8, the bottom shield pads 831 and 832 may have approximately the same surface area. By providing two bottom shield pads of approximately the same area, the capacitance between each of bottom shield pads 831 and 832 and the substrate 600 may have approximately the same magnitude, thereby facilitating wafer level balanced capacitance.

Figure 9A:
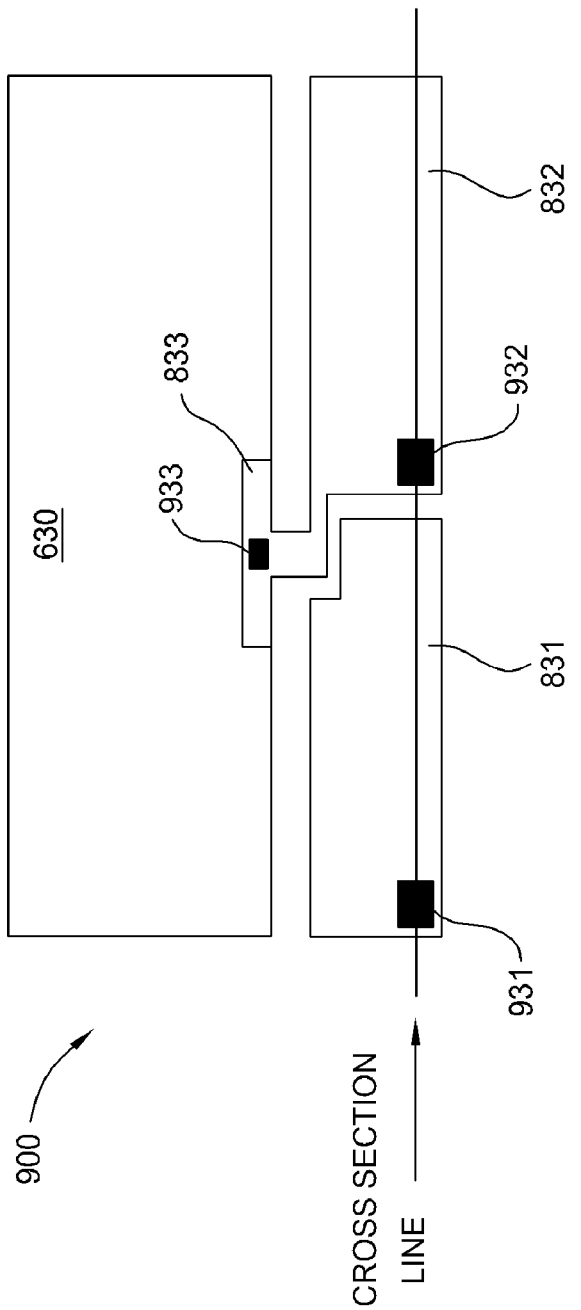
FIGS. 9A and 9B illustrate one or more contacts formed on the bottom shield pads according to an embodiment of the invention.

A second insulator layer may be formed on the bottom shield pads 831 and 832 and contacts may be formed therein. FIG. 9A illustrates a top view of substrate after contacts have been formed thereon. As illustrated in FIG. 9A, a contact 931 is formed on the bottom shield pad 831 and a contact 932 is formed on the bottom shield pad 832. The contacts 931 and 932 may be configured to couple the bottom shield pads to a respective top shield pad. In one embodiment, a contact 933 may be formed on the portion 833 of the bottom shield pad 832 to couple the bottom shield pad 832 with a magnetic head to be formed in the region 630.

Figure 9B:
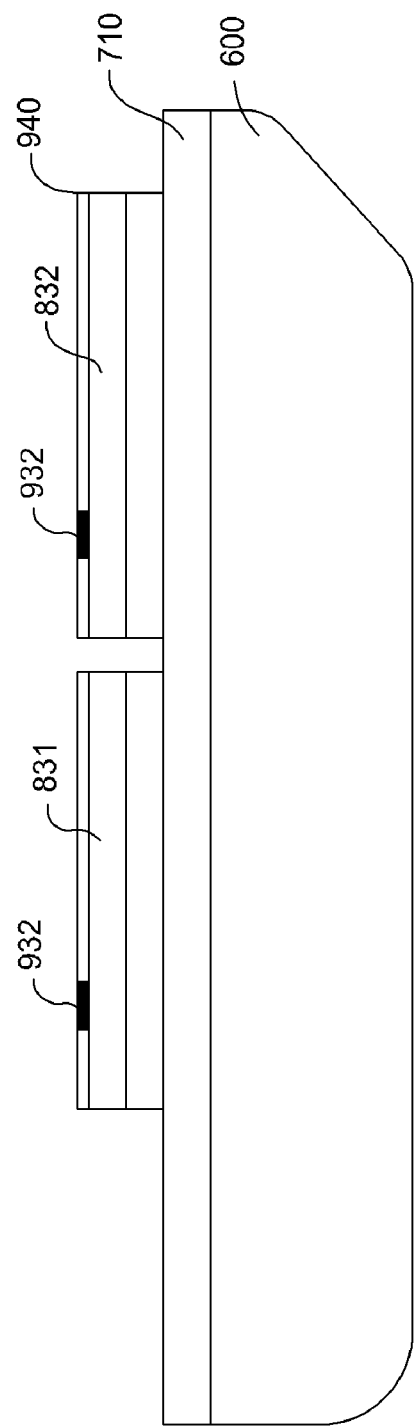

FIG. 9B illustrates a cross sectional view of the kerf region after the contacts 931 and 932 are formed. As illustrated in FIG. 9B, the contacts 931 and 932 are formed in a second insulator layer 940 formed on the bottom shield pads 831 and 832.

In one embodiment of the invention, the magnetic head 130 may be formed and planarized after the bottom shield pads 831 and 832 are formed. Forming the magnetic head may include forming one or more layers using techniques such as, for example, deposition, etching, sputtering, and the like. In a particular embodiment of the invention, the magnetic head 130 may be a CPP head structure. Therefore, forming the magnetic head 130 may include forming shield pads 220 and 230, TMR element 210, insulator layers 250 and/or 260, and hard magnetic layer 260, as illustrated in FIG. 2B. The magnetic head may be formed in the region 630 such that a bottom shield 230 is coupled with bottom shield pad 832.

In one embodiment of the invention, the top shield pads may be formed after the magnetic head 130 and the contacts 931 and 932 are formed. FIG. 10A illustrates a top view of top shield pads 1031 and 1032 formed on the substrate. FIG. 10B illustrates a cross sectional view of the substrate in the kerf region 140 after the top shield pads 1031 and 1032 are formed. As illustrated in FIGS. 10A and 10B, top shield pad 1031 overlies the bottom shield pad 831. The contact 931 formed in the second insulator layer 940 connects the top shield pad 1031 to the bottom shield pad 831. Top shield pad 1032 overlies the bottom shield pad 832. The contact 932 formed in the second insulator layer 940 connects the top shield pad 1032 to the bottom shield pad 832.

Further, as illustrated in FIG. 10A, a portion 1033 of top shield pad 1031 may extend over the magnetic head 130. The portion 130 may be configured to couple the top shield pad 1031 to a top shield 220 of the magnetic head 130. In some embodiments, the portion 1033 may form the top shield pad 220 of the magnetic head 130. The top shield pads 1031 and 1032 may correspond to the top shield pads 320 and 330 illustrated in FIG. 5.

Wafer probes of a testing circuit 340 may be coupled with the top shield pads 1031 and 1032 to exchange test signals such as, for example, a test current I between the test circuit and the magnetic head 130.

By providing two relatively equally sized bottom shield pads, embodiments of the invention, balance the impedance to substrate, thereby nullifying the effects of interference during wafer level testing.

While the foregoing is directed to embodiments of the present invention, other and further embodiments of the invention may be devised without departing from the basic scope thereof, and the scope thereof is determined by the claims that follow.

What is claimed is:

1. A wafer, comprising:
    a plurality of magnetic heads formed thereon, wherein the plurality of magnetic heads are separated by a kerf region;
    a first top shield pad and a second top shield pad formed in the kerf region, wherein the first top shield pad is electrically coupled with a first surface of a magnetic head; and
    a first bottom shield pad and a second bottom shield pad formed in the kerf region, wherein the first bottom shield pad is electrically coupled with a second surface of the magnetic head, and wherein the first top shield pad is electrically coupled with the second bottom shield pad and the first bottom shield pad is electrically coupled with the second top shield pad.

2. The wafer of claim 1, wherein the first bottom shield pad and the second bottom shield pad have substantially similar surface area.

3. The wafer of claim 1, wherein the first top shield pad is configured to couple with a first probe of a testing device and the second top shield pad is configured to couple with a second probe of the testing device, wherein the testing device is configured to generate test signals for testing the magnetic head.

4. The wafer of claim 1, wherein the first bottom shield pad and the second bottom shield pad have a substantially similar impedance to a substrate on which the plurality of magnetic heads are formed.

5. The wafer of claim 1, wherein the magnetic head is a Current Perpendicular to Plane (CPP) head structure.

6. A method for fabricating magnetic heads, comprising:
    forming a plurality of magnetic heads on a wafer, wherein the plurality of magnetic heads are separated by a kerf region;
    forming a first top shield pad and a second top shield pad in the kerf region, wherein the first top shield pad is electrically coupled with a first surface of a magnetic head; and
    forming a first bottom shield pad and a second bottom shield pad in the kerf region, wherein the first bottom shield pad is electrically coupled with a second surface of the magnetic head, and wherein the first top shield pad is electrically coupled with the second bottom shield pad and the first bottom shield pad is electrically coupled with the second top shield pad.

7. The method of claim 6, wherein the first bottom shield pad and the second bottom shield pad are formed with substantially similar surface area.

8. The method of claim 6, wherein the first bottom shield pad and the second bottom shield pad are formed with a substantially similar impedance to a substrate on which the plurality of magnetic heads are formed.

9. The method of claim 6, wherein the magnetic head is formed as a Current Perpendicular to Plane (CPP) head structure.

10. The method of claim 6, further comprising forming a first insulator layer on a substrate on which the plurality of magnetic heads are formed and forming the first bottom shield pad and the second bottom shield pads on the first insulator layer.

11. The method of claim 6, further comprising forming a second insulator layer on the first bottom shield pad and the second bottom shield pad and forming the first top shield pad and the second top shield pad on the second insulator layer.

12. The method of claim 11, wherein the second insulator layer comprises a first metal via and a second metal via disposed therein, wherein the first metal via is configured to electrically couple the first top shield pad to the second bottom shield pad, and the second metal via is configured to electrically couple the second top shield pad with the first bottom shield pad.

13. A method of testing a magnetic head, comprising:
    coupling a first probe of a testing device with a first top shield pad formed in a kerf region of a wafer comprising a plurality of magnetic heads formed thereon, wherein the first top shield pad is electrically coupled with a first surface of a magnetic head and a first bottom shield pad;
    coupling a second probe of the testing device with a second top shield pad formed in the kerf region, wherein the second top shield pad is coupled with a second bottom shield pad, the second bottom shield pad being coupled with a second surface of the magnetic head;
    transferring a test signal to the magnetic head via the first top shield pad; and
    receiving the test signal from the magnetic head via the second top shield pad.

14. The method of claim 13, wherein the first bottom shield pad and the second bottom shield pad have substantially similar surface area.

15. The method of claim 13, wherein the first bottom shield pad and the second bottom shield pad have a substantially similar impedance to a substrate on which the plurality of magnetic heads are formed.

16. The method of claim 13, wherein the magnetic head is a Current Perpendicular to Plane (CPP) head structure.

17. A system, comprising:
    a wafer, comprising:
        a plurality of magnetic heads formed thereon, wherein the plurality of magnetic heads are separated by a kerf region;
        a first top shield pad and a second top shield pad formed in the kerf region, wherein the first top shield pad is electrically coupled with a first surface of a magnetic head; and
        a first bottom shield pad and a second bottom shield pad formed in the kerf region, wherein the first bottom shield pad is electrically coupled with a second surface of the magnetic head, and wherein the first top shield pad is electrically coupled with the second bottom shield pad and the first bottom shield pad is electrically coupled with the second top shield pad; and
    a testing device comprising:
        a first probe coupled with the first top shield pad; and
        a second probe coupled with the second top shield pad, wherein the first probe is configured to transfer a test signal for testing the magnetic head to the first top shield pad and the second probe is configured to provide a return path for the test signal.

18. The system of claim 17, wherein the first bottom shield pad and the second bottom shield pad have substantially similar surface area.

19. The system of claim 17, wherein the first bottom shield pad and the second bottom shield pad have a substantially similar impedance to a substrate on which the plurality of magnetic heads are formed.

20. The system of claim 17, wherein the magnetic head is a Current Perpendicular to Plane (CPP) head structure.

21. The system of claim 17, wherein the testing device comprises an amplifier circuit configured to amplify an electrical value measured across the first probe and the second probe.

22. The system of claim 17, wherein the testing device further comprises a spectrum analyzer configured to analyze the test signal and determine whether the magnetic head is defective.

* * * * *